July 7, 1936.  R. A. L. VOLET  2,046,803
DEVICE FOR CONTROLLING VARIABLE AND ADJUSTABLE CONDENSERS
Filed March 23, 1935   3 Sheets-Sheet 1

INVENTOR
R. A. L. VOLET
By D. P. Wallace
Atty

July 7, 1936.    R. A. L. VOLET    2,046,803
DEVICE FOR CONTROLLING VARIABLE AND ADJUSTABLE CONDENSERS
Filed March 23, 1935    3 Sheets-Sheet 2

INVENTOR.
R. A. L. VOLET

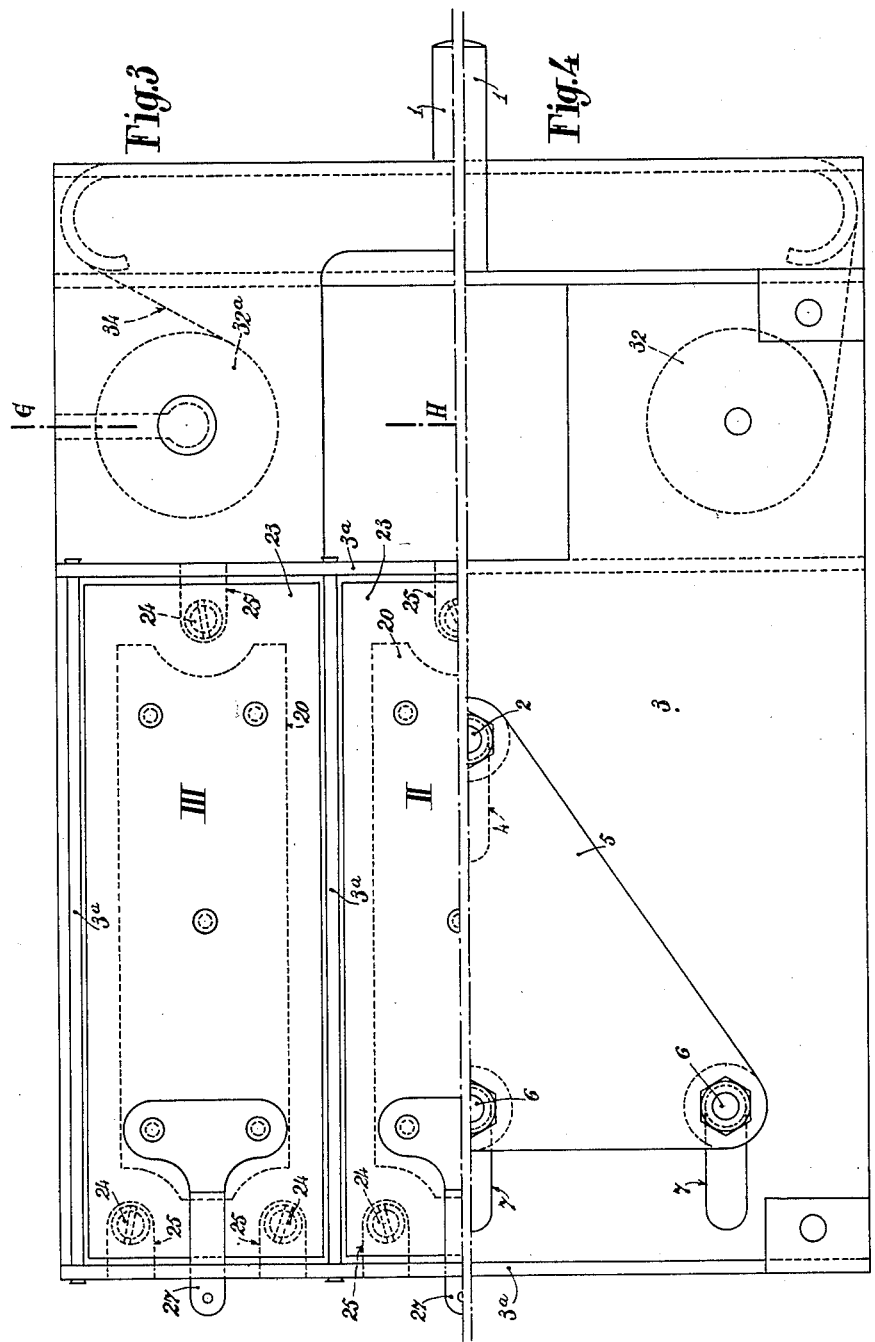

Patented July 7, 1936

2,046,803

UNITED STATES PATENT OFFICE 2,046,803

DEVICE FOR CONTROLLING VARIABLE AND ADJUSTABLE CONDENSERS

René Alfred Laurent Volet, Paris, France, assignor to Blemer (S. A. R. L.), Paris, France Application March 23, 1935, Serial No. 12,706
In France March 30, 1934

3 Claims. (Cl. 74—10)

The present invention relates to a device for controlling single or multiple variable and adjustable condensers, applicable more particularly, but not exclusively, to radiotelegraph or radiotelephone installations.

This device affords the following various advantages:—

1. It is possible to determine readily the curve of the variation of the capacity as a function of the control.

2. It is easy to bring the origin of the theoretical curve into coincidence with the mechanical curve resulting therefrom (zero-setting).

3. In the case of multiple condensers, it is possible to displace each of the elements individually relatively to the theoretical curve so as to take any point of the said curve as the origin of each circuit.

4. The residual capacity of each element is as low as may be desired, whereby the ratio of the possible extreme capacities may be considerably increased.

5. The control is effected with a considerable direct gearing down, while permitting on the one hand direct adjustment and on the other hand the operation, by very simple means, of a very legible indicator.

6. All mechanical play is taken up by antagonistic springs, the opposed forces of which compensate each other so as not to offer any resistance during the manipulation of the device.

7. The device for giving indications corresponding to the movements of the driven parts of the condenser or of the whole of the condensers is readily adjustable and is connected in a positive manner to the movements of the said parts.

The apparatus is shown by way of example in the accompanying drawings, in which:—

Figure 3 is a plan view of the upper part of Figure 1, it being understood that the portion not shown is symmetrical relatively to the half shown.

Figure 4 is a plan view of the lower half of Figure 1, it being understood that the portion not shown is symmetrical relatively to the part shown.

In the constructional example shown, the apparatus comprises three unit elements of condensers and is provided with a known moving band type of indicator. The apparatus may be constructed, however, with absolutely any desired number of unit elements of condensers and the indicator device may be of any other type.

Figure 5:
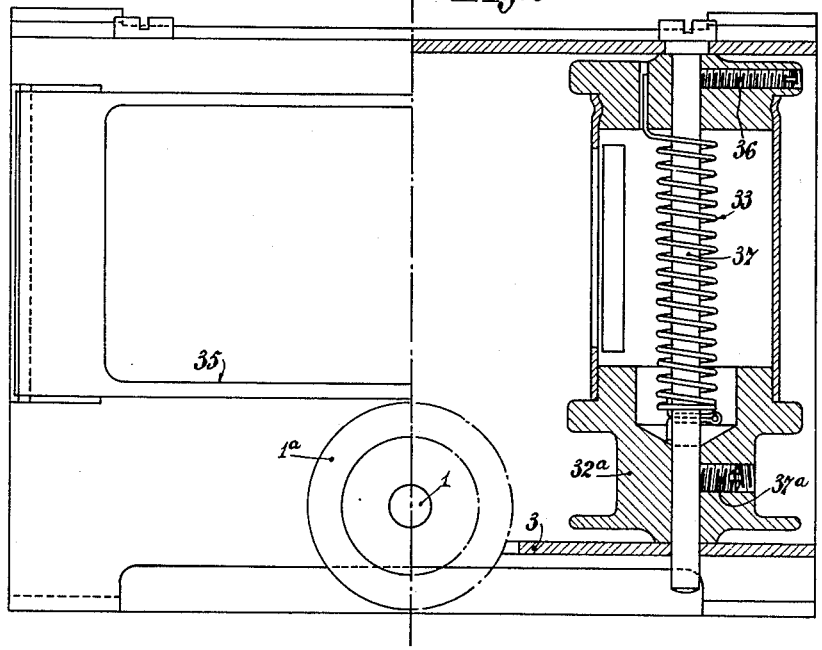
Figure 5 shows a front view of the left hand half of the apparatus, the right hand half being shown sectioned along the line G—H in Figure 3.

The apparatus substantially comprises a driving shaft 1, on one end of which is secured any desired operating member, for example a milled knob 1ᵃ (Figure 5).

The other end of the said shaft is screw-threaded for screwing in a nut 2 comprising a stud 2ᵃ, sliding in a guide slot 4 of a base plate 3 fixed to the vertical plates 3ᵃ forming the body or frame of the apparatus. Connected to the stud of the nut 2 is a part 5, for example a plate, for transmitting simultaneously the control of the movement to each of the unit elements I, II, III of the multiple condenser. For this purpose, the said part 5 is secured to three slide blocks 6 (one for each of the elements I to III) and each of these slide blocks is guided in a slot 7 in the base plate 3.

Figure 1:
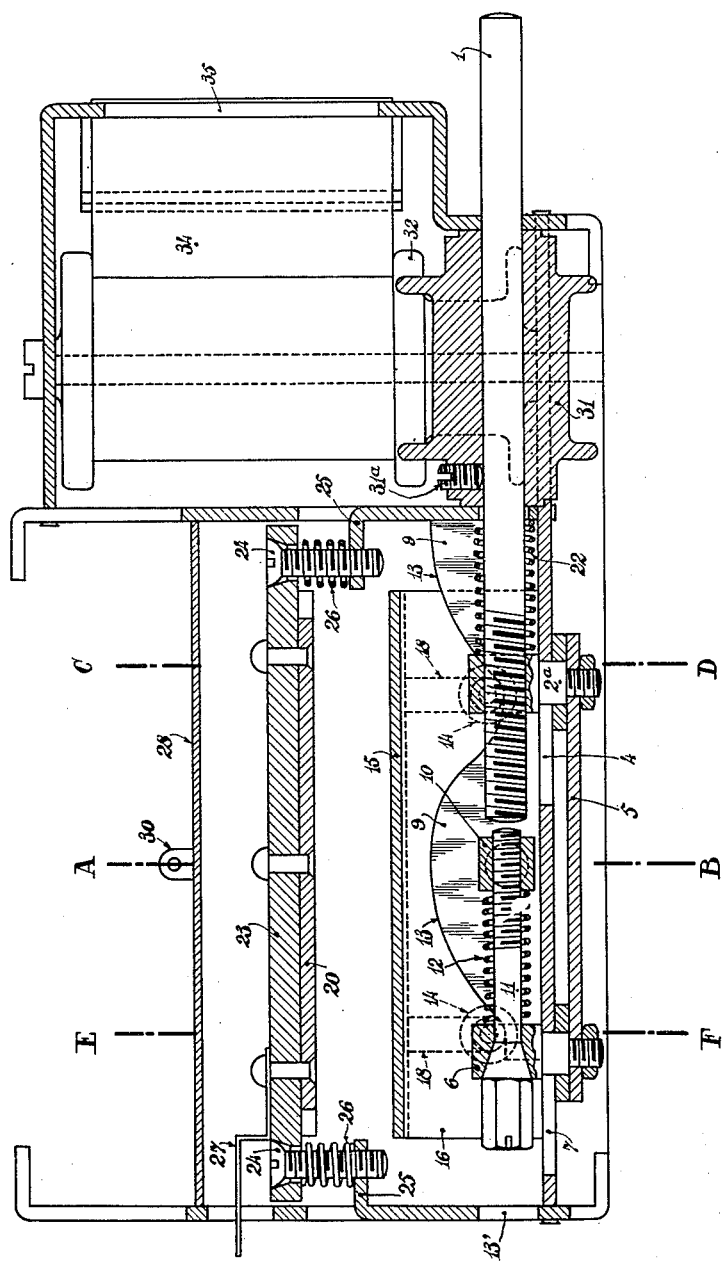
Figure 1 is a longitudinal vertical section along the axis of the driving shaft.
Figure 2:
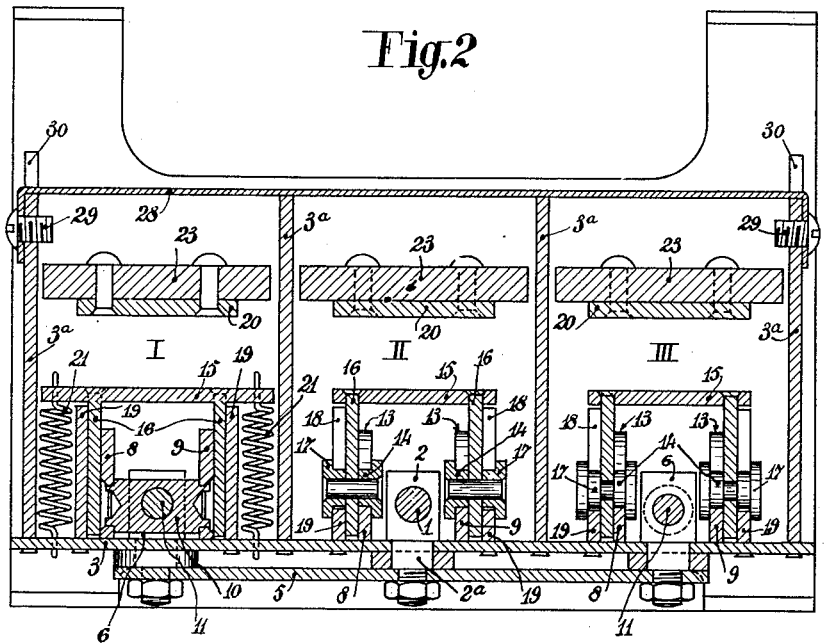
Figure 2 is a transverse vertical section in the centre along the line A—B, on the right hand along the line C—D and on the left hand along the line E—F in Figure 1.

For each element I, II and III, the slide block 6 is connected to a pair of cams 8, 9 through the medium of a screw 11 and a cross-member 10 forming a nut of the said screw (see Figure 1 and the element I, Figure 2). Between the slide block 6 and the nut 10 and round the screw 11 is an expansion spring 12. The head of the said screw is provided with faces or is slotted and may be reached by means of an appropriate screw-driver passing through an orifice 13' in the frame. The said screw head comprises a conical part ensuring with the cooperation of the spring 10 a wedging or jamming effect and consequently an adhesion relatively to the slide block sufficient to prevent the screw 11 from becoming loose of its own accord or during the operation of the shaft 1. Any other arrangement producing the same effect may be employed.

The twin cams 8, 9 bear on the base plate 3 either directly or by means of small bearing balls, not shown. Resting on the profiled part 13 of each of these cams is a fast or idle roller 14 having its spindle 14ᵃ secured to the moving plate 15 of the corresponding element of the condenser by means of two side plates 16 fixed, for example riveted, to the said moving plate.

Each spindle 14ᵃ carries a second fast or idle roller 17 sliding in a slot 18 in a counter-plate 19 secured, for example riveted, to the base plate 3. It is possible, however, to ensure this connection by means which enable the initial position of the counter-plates 19 to be adjusted separately for each element I to III, the said adjusting means replacing or supplementing the screw, nut and spring system 6, 10, 11, 12.

The object of the mechanism just described is to cause the moving plate 15, under the action of the driving shaft 1, to approach or move away from the fixed, insulated plate 20 of the variable condenser. The movement of the plate 15 away from the fixed plate 20 is produced either positively by any appropriate means or preferably by return springs 21 which ensure for the entire mechanism a permanent contact without play.

Likewise, in order to prevent any play in the drive between the shaft 1 and the nut 2, it is possible to provide, for example around the said shaft, an expansion spring 22, the force of which is consequently in opposition to that of the springs 21 which are tensioned when the spring 22 is relaxed and vice versa. The forces of these springs therefore compensate each other and consequently no resistance due to the said springs is felt during operation.

The fixed condenser plate of each element I to III is constituted by a metal part connected for example by means of rivets, to an insulating support 23. The latter is connected to projections 25 of the frame by means, for example, of three spherically headed screws 24 against which a spring 26 applies the acutely conical wall of the orifice of the support 23. This ball-and-socket assembly enable the position of the plate 20 to be adjusted relatively to the moving plate 15, the pressure exerted by the spring 26 clamping the heads of the screws 24 in their conical seats, thus ensuring that the aggregate 20—23 will be held in the given position.

A terminal 27 connected to the plate 20 serves as connection for attachment to a suitable conductor.

A cover 28 fixed to the frame by screws 29 covers in the whole apparatus, while lugs 30 integral with the frame 3ª and passing through the said cover, are adapted to serve as support for lead guarantee seals for preventing access for example to the screws 24 and thus obviating any untimely alteration of the adjustment.

The arrangements described in the foregoing permit the variations in the spacing between the plates 15 and 20 of the condenser to be made under exact conditions which may be selected beforehand at will by giving a predetermined profile 13 to the cams 8, 9 for all the elements I, II etcetera, irrespective of their number, it being understood that the said selection, that is to say the said adjustment, may differ from one element to the other.

It is possible, in addition, to perfect this initial adjustment by acting on the one hand on the screws 24, for example in order to bring each plate 20 into a point corresponding to the zero of the selected curve which the variation of the capacity is to follow and, on the other hand, on the screw 11 of any of the elements I, II etcetera, according to the requirements of the circuit of the element under consideration, the effect of which is to modify the point of origin of the aforesaid curve by displacing the initial point of application of each roller 14 on the cams 8, 9.

In order to prevent any direct contact between the plates 15 and 20, a sheet of any desired insulating material may be fixed on either of the condenser plates. The said sheet may have a considerable dielectric constant which may be utilized in the determination of the profiles 13 of the cams 8 and 9 with the object of increasing the capacity of the condensers at the end of the approach movement.

The condenser plates 15 and 20, which are shown plane, may have any other form whatsoever, and may be constituted for example by portions of a cylinder or sphere. They may have an undulated profile or may be constituted by series of plane or profiled sheets, for example in spiral form, etcetera, which inter-engage one within the other.

Finally, the apparatus necessarily comprises a device for giving by means of suitable signs, for a given adjustment and for any angular position of the shaft 1, indications corresponding to the movements of the condenser as a whole. The indicating device about to be described is of the known type comprising a flexible band winding off one bobbin or roller and winding on another, the two rollers being actuated by means of a cable drive through the medium of a drum winch 31 secured by a screw 31ª to the shaft 1. In the present case, however, the following arrangements are adopted to enable the indicator to be set, that is to say adjusted, readily and with considerable exactness.

The two drum bobbins 32, 32ª each comprise a torsion spring 33 attached by one end to the upper flange of the bobbin and by the other end to the spindle on which the corresponding bobbin is mounted. Each of the drums 32, 32ª is secured to its spindle 37 by means of a set screw 37ª, but on the contrary only one (32ª) of the bobbins has a set screw 36.

In order to adjust the position of the flexible band 34 relatively to any desired reference mark visible in the window 35, the screw 36 is first loosened and the band 34 together with the control cable remaining tensioned, the relative angular position of the two bobbins with regard to their drums 32, 32ª is then altered, and when this adjustment has been made, the screw 36 is blocked on the spindle 37 so as to secure the bobbin and its drum 32ª completely to the spindle 37. Under these conditions, the spring of the other bobbin will then ensure constant tension both of the band 34 and the cables passing from the driving drum 31 to the drums 32, 32ª.

The constructional details of the entire apparatus just described may be modified without departing from the scope of the invention. Finally, the apparatus may comprise numerous applications other than radiotelephony or radiotelegraphy.

What I claim is:

1. In a variable condenser, a movable condenser element, and means for actuating said condenser element comprising a rotatable threaded shaft, means holding said shaft against longitudinal movement, a nut on said shaft, a cam connected with said nut for movement with the latter longitudinally with respect to the shaft when the shaft is rotated, means holding the movable condenser element against movement longitudinally with respect to the shaft, said condenser element being movable perpendicularly with respect to said shaft, and cam follower means connected with said condenser element and cooperating with said cam so that when the latter is moved by rotation of the shaft the condenser element is adjusted in accordance with the contour of the cam; a second condenser element with which the movable condenser element cooperates, supporting means for said second condenser element, screws extending through said second condenser element into said supporting means, and springs between said second condenser element and said supporting means.

2. In a variable condenser, a movable condenser element, and means for actuating said condenser element comprising a rotatable threaded shaft, means holding said shaft, against longitudinal movement, a nut on said shaft, a member connected with said nut for movement with the latter longitudinally with respect to the shaft when the shaft is rotated, a block carried by said member, a headed screw alined with said shaft, said screw extending through said block and having its head engaged with the side of said block remote from the shaft, a nut in which said screw is threaded, said nut being located between the shaft and said block, a spring between said block and said last mentioned nut, a cam connected with said second mentioned nut for movement with the latter longitudinally with respect to the shaft when the latter is rotated, means holding the movable condenser element against movement longitudinally with respect to the shaft, said condenser element being movable perpendicularly with respect to said shaft, and cam follower means connected with said condenser element and cooperating with said cam so that when the latter is moved by rotation of the shaft the condenser element is adjusted in accordance with the contour of the cam.

3. In a variable condenser as set forth in claim 2, a plurality of blocks carried by the member which is connected with the nut on the shaft, and a screw, spring, nut, cam, cam follower and movable condenser element individual to each block.

RENÉ ALFRED LAURENT VOLET.